July 19, 1932.  R. E. PELTERIE  1,868,199

PACKING DEVICE

Filed April 4, 1927   2 Sheets-Sheet 1

INVENTOR:
Robert Esnault-Pelterie,
By Attorneys,

July 19, 1932.  R. E. PELTERIE  1,868,199
PACKING DEVICE
Filed April 4, 1927   2 Sheets-Sheet 2

INVENTOR
Robert Esnault-Pelterie
By Attorneys,
Fraser, Myers & Manley

Patented July 19, 1932

1,868,199

UNITED STATES PATENT OFFICE

ROBERT ESNAULT PELTERIE, OF PARIS, FRANCE

PACKING DEVICE

Application filed April 4, 1927, Serial No. 180,875, and in Great Britain April 9, 1926.

This invention relates to packing means for use in preventing the leakage of gas or liquid between slidable or other movable members, and is more especially intended for use with plunger stuffing boxes and for other like packing purposes.

The object of this invention is to provide improved packing means to prevent leakage of gas or liquid between such relatively moving parts even when such fluids are under high pressure.

According to the present invention the packing means consists of a lamina or laminæ of a vegetable material such as photographic or cinematographic film, of untanned calf or other suitable animal skin, vegetable parchment, vellum, or other like material of a flexible but stiff nature, the said packing means when in operative position and whether composed of one lamina or of a number of superimposed laminæ having a central opening, the material contiguous to said opening being inclined relatively to the plane of the packing and extending toward the end of the packing which is subjected to high fluid pressure. The angular portion may converge forwardly of the plane of the packing means or rearwardly thereof at an angle to the said plane varying preferably between the limits of 30° to 60°. Packing means in accordance with the present invention may consist of any material or combination of materials which are of a semi-flexible nature, but it is preferred to employ a vegetable material such as the celluloid used in photographic or cinematographic film, this having been found to be more resistant to wear than other materials. However, other known packing materials are capable of being efficiently used in accordance with the present invention. Packing means formed of the desired material may be in the form of a circular, square, rectangular, or other conveniently-shaped lamination, and may have the offset angular portion formed thereon before application and assembly of the lamination as a packing means, or such angular offset portion may be shaped in situ, that is, by the means which clamp or retain the lamination or laminations in the packing device when assembled. One or more than one lamination may be used to form one layer of packing material, and any number of such layers may be used, each of such layers being clamped and retained in position by and between adjacent clamping or retaining means. Further objects of the invention will be apparent from the following description.

In order that the invention may be clearly understood and readily carried into effect, reference is made to the accompanying drawings which show by way of example packing means in accordance with the invention.

Figure 1 is a longitudinal axial cross-section of a pump plunger and so much of its casing as is necessary for the purpose of illustrating the present invention.

Fig. 2, drawn to an enlarged scale, shows in cross-section one layer of packing material assembled between two clamping or retaining members.

Figure 5:

Fig. 5, drawn to an enlarged scale, is a cross-sectional elevation showing the edge formation of the central portion of the packing material, and also the inclination of the said central portion with respect to the plane of the packing material.

Figure 6:
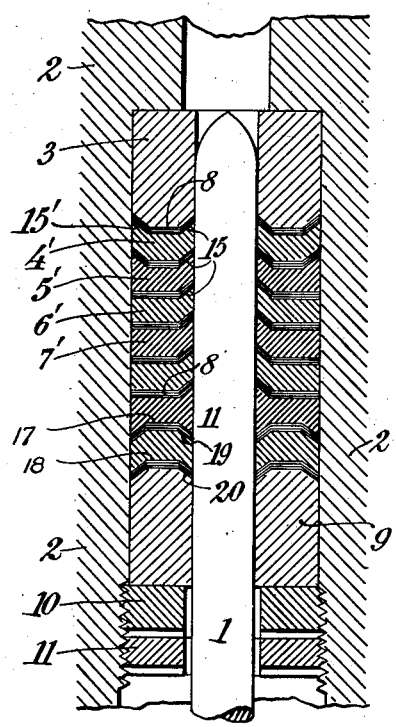

Fig. 6 is a sectional central plan of part of a pump plunger and so much of its casing as is necessary to illustrate a modified arrangement in accordance with the present invention, such modification employing oppositely tapered or offset packing discs to seal the packing against fluid pressure from either end.

Figure 7:
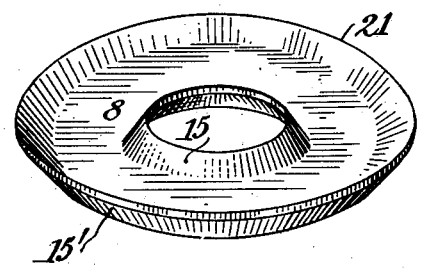

Fig. 7 is a perspective view of a modified form of packing disc having both central and peripheral flanges.

Figure 8:
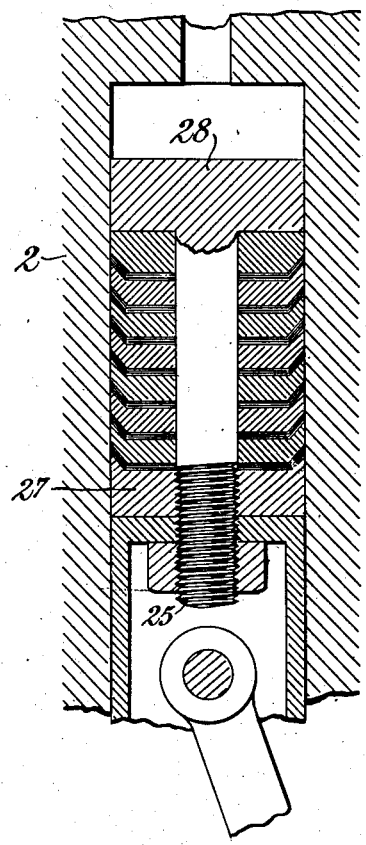

Fig. 8 is a longitudinal axial cross-section of a modified form of packing adapted primarily for sealing the space between a piston and cylinder.

Figure 1:
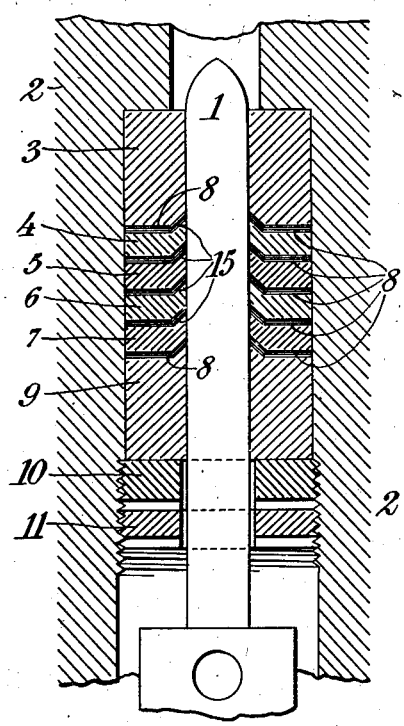
Figure 3:
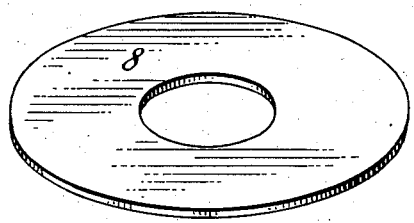
Fig. 3 shows a plain flat lamination or disc of packing material, such lamination or disc being unshaped, but being capable of being shaped when applied between the clamping or retaining means.

Referring to Figure 1, 1 is the plunger, 2 the casing in which the plunger is reciprocated by any suitable means, the means for reciprocating the plunger being omitted, however, as such means forms no part of the present invention. 3 is an annulus or collar which guides the plunger in its movement, and 4, 5, 6 and 7 are rings which act as clamping and retaining or shaping means for a layer of packing material indicated at 8. 9 is an annulus which also acts as shaping means and also as a guide for the plunger 1. The rings 4, 5, 6 and 7 and the layers of packing material 8 therebetween, together with the annulus or collar 9, are clamped in position by a ring-nut 10 with or without a ring-jamnut 11. The packing material 8 may consist of untanned calf or other suitable animal skin, vegetable parchment, vellum, or other material of a flexible but stiff nature, but it is preferred that such packing material consist of a cellulose plastic such as the celluloid which is used in cinematographic film or cellulose acetate plastic, either of these last-named materials having been found to stand up under severe conditions.

Figure 2:
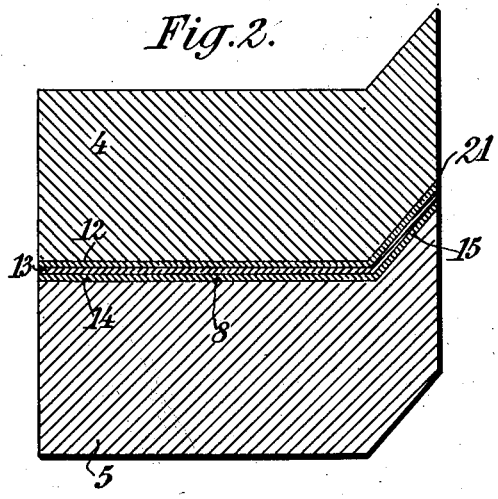

In Fig. 2, which is drawn to an enlarged scale, each of the packings 8 is shown as comprising three laminations or a stack of thin flat discs 12, 13 and 14. The central portion of each lamination or disc of packing material is conically flanged, as at 15, the conical surfaces of the flange in the device illustrated forming an angle of approximately 50° with the plane of the disc.

It should be clearly understood that the angle of the conical flanges may be varied, and any angle between the limits of 30° and 60° will give good results. Obviously any or all of the individual packings may be both centrally and circumferentially flanged to provide a tight seal not only against the relatively moving surface of the plunger 1, but also against the stationary surface of the bore within which the packing is carried. Such circumferential conical flanges are shown at 15' in Figs. 6 and 7. Since the ring nut 10 and the collar 3 very largely seal the external passage between the packing and the bore in which it is held, only a few of the individual packings need be provided with the external conical sealing flanges 15'. The annular packing supporting elements 4', 5', 6' and 7' interposed between the stacks of packing discs are formed with conical surfaces, the conicity thereof corresponding to that of the flange portions 15, 15' of each disc. Further, where a plurality of packing layers or discs 8 are used, the offset or conical portions of the different layers may be arranged at different angles within the aforesaid limits. The packing supporting elements 4', 5', 6', etc. and the end collars 3, 9, are provided with external conical surfaces 15' as well as internal conical surfaces 15 when it is desired to use double-flanged packings.

In the arrangement shown in Fig. 6, eight layers of packing means are shown, the first six being represented as hereinbefore by the reference numeral 8, and the last two being represented by the reference numerals 17 and 18. The conical or angular portions 19, 20 of the last two layers 17, 18 of the packing means are shown as being offset in the opposite direction to the angularly offset portions 15 of the first six layers of packing means. As will be seen from Fig. 6, only two layers of packing means are offset rearwardly, the other six layers being offset forwardly, such an arrangement being provided where it is necessary to prevent the flowing in of air during, say, the suction period of the plunger 1, or where at certain times internal pressure may be less powerful than the external pressure.

Where, however, the pressure acts between two chambers, as in a double-acting pump, the forwardly directed portions of the layers of packing should preferably be equal in number to the rearwardly-directed portions of the layers of packing.

Figure 4:
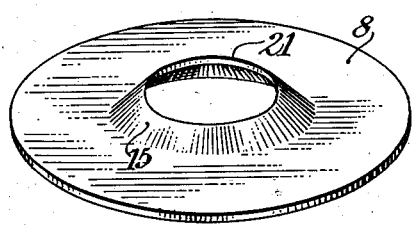
Fig. 4 shows a flat lamination or disc of packing material having a shaped angular central portion of the packing lamination or disc.

In Figs. 2, 4 and 5 it will be seen that the individual packing discs provide very sharp chisel-like edges 21 which engage the surface to be packed or sealed. It has been found that the sharpness of this chisel-edge plays an important part in the increased effectiveness of the packing according to the present invention. Furthermore, by laminating the packing so that a considerable number of relatively thin discs are employed, the number of chisel-like packing edges is increased, with a corresponding increase in the effectiveness of the packing. Celluloid, cellon, (a cellulose acetate plastic) or other cellulosic base materials generally referred to as cellulose plastics have been found to make effective packing discs when used in relatively thin sheets, and in actual practice sheets of cinematographic film have been found to give excellent results. Such material may be employed in a packing according to the present invention because of the fact that the parts which are sealed have a reciprocating motion. Material of this nature would be unsuitable for rotary bearings, as celluloid or similar substances are known to have an abrasive effect upon even the hardest steel, and would in a rotary bearing very soon score and roughen the shafts. In the present device, because of the effectiveness of the seal obtained by relatively thin laminæ of packing material, the wear on the moving parts is reduced to a minimum, even though a hard substance like celluloid is used for the packing, because of the fact that only a very small area of contact is required between the packing and the working surface against which it rests.

A further advantage of the laminated packing according to the present invention is that in using discs of material such as celluloid, small ruptures sometimes occur toward the edges of the conical flanges of the packing discs. With several discs superimposed, it will rarely happen that these ruptures occur at the same points in the several flanges, so that one flange serves as an effective seal at the points where the adjacent flange may have been damaged.

In Fig. 7 illustrating the type of packing employed at the two upper and two lower strata of the multiple packing shown in Fig. 6, it will be seen that the peripheral flange 15′ is provided with a sharp chisel-like edge corresponding to the sharp edge 21 of the central flange, and the function of both these sharp edges is the same as has already been described.

A modified form of packing suitable particularly for a piston is illustrated in Fig. 8. The packing is in principle identical with that of the embodiments above described. The only structural difference that exists is the locating of means for clamping the packing directly upon the moving piston rod 25 instead of mounting it upon the stationary cylinder wall 2. Since the relative motion between the parts occurs between the packing discs and the stationary wall of the cylinder, the said discs are flanged peripherally in order to seal the working surface between the piston and the cylinder. A packing nut 27 is threaded directly upon the piston rod 25 and clamps the composite packing securely against the piston head 28.

While in the constructions hereinbefore described a plurality of packing discs have been stacked together to provide laminated packings, it is to be understood that a single disc formed as described, with a conically-flanged portion, will for certain purposes provide an effective seal against the working surface of a reciprocating part. Furthermore, whether one or more packing discs are required for any given purpose, it is true that an effective seal is obtained with a minimum of friction because the actual area of contact represented by the thin edges of the packing discs is very small.

While various modifications and embodiments of my invention have been hereinbefore described and illustrated, it is to be understood that the invention is not limited thereto, but may be otherwise variously embodied and modified without departing from the spirit of the invention as set forth in the following claims.

What I claim is:

1. A packing device for pistons, plungers, and other sliding parts, said device comprising a packing ring made of a cellulose plastic, said ring being in the form of a conical annulus, and supporting elements for said packing, said elements having conical surfaces corresponding in form to the conicity of said packing, and being adapted to hold said packing ring in contact with the working surface which is sealed by the said packing device, whereby to present a sharp edge of cellulose plastic to said working surface.

2. A packing device for pistons, plungers, and other sliding parts, said device comprising a packing ring made of a cellulose plastic, said packing ring being in the form of a conical annulus, the said annulus having a chisel-like edge of cellulose plastic adapted to contact with the working surface to be sealed.

3. A packing device for pistons, plungers, and other sliding parts, said device comprising a plurality of coaxial laminated packings, and rigid packing-supporting rings flanking said packings, the said laminated packings being built up out of a plurality of discs of cellulose plastic.

4. A packing device for pistons, plungers, and other sliding parts, said device comprising sheets of cellulose plastic, said sheets being so formed as to present sharp edges to the working surface to be sealed by the packing.

5. A packing device for pistons, plungers, and other sliding parts, said device comprising a laminated packing formed by stacking together a plurality of discs of cellulose plastic, the edges of said discs engaging a working surface which is sealed by the packing.

6. A packing device for pistons, plungers, and other sliding parts, said device comprising a laminated packing formed by stacking together a plurality of thin conically flanged discs of cellulose plastic such as is used for photographic films.

7. A packing device for pistons, plungers, and other sliding parts, said device comprising a laminated packing formed by stacking together a plurality of separate discs of cellulose acetate plastic, said discs being so disposed as to present their free edges to the surface which is to be packed.

8. As a new article of manufacture, a sheet of cellulose plastic in the form of a conically flanged disc, the working edge of said flanged disk being sharpened to present to the working surface which is to be sealed by the packing, a chisel-like edge.

In witness whereof, I have hereunto signed my name.

ROBERT ESNAULT PELTERIE.